(12) United States Patent
Chen et al.

(10) Patent No.: US 12,131,510 B2
(45) Date of Patent: Oct. 29, 2024

(54) OBJECT DETECTION SYSTEM CAPABLE OF COMPENSATING VARYING LIGHT INTENSITY

(71) Applicant: Himax Technologies Limited, Tainan (TW)

(72) Inventors: Wu-Feng Chen, Tainan (TW); Ching-Wen Wang, Tainan (TW); Cheng-Che Tsai, Tainan (TW); Hsueh-Tsung Lu, Tainan (TW)

(73) Assignee: Himax Technologies Limited, Tainan (TW)

( * ) Notice: Subject to any disclaimer, the term of this patent is extended or adjusted under 35 U.S.C. 154(b) by 473 days.

(21) Appl. No.: 17/488,004

(22) Filed: Sep. 28, 2021

(65) Prior Publication Data

US 2023/0098230 A1 Mar. 30, 2023

(51) Int. Cl.
*G06V 10/145* (2022.01)
*G03B 21/20* (2006.01)
*H04N 23/56* (2023.01)

(52) U.S. Cl.
CPC ....... *G06V 10/145* (2022.01); *G03B 21/2033* (2013.01); *H04N 23/56* (2023.01)

(58) Field of Classification Search
CPC .......... G06V 10/145; G06V 2201/121; G06V 10/141; G06V 40/172; G03B 21/2033; G03B 13/00; H04N 23/56
USPC ...................................................... 348/370
See application file for complete search history.

(56) References Cited

U.S. PATENT DOCUMENTS

| | | | | |
|---|---|---|---|---|
| 8,363,157 B1* | 1/2013 | Han | ................. | H04N 23/56 |
| | | | | 348/370 |
| 11,294,422 B1* | 4/2022 | Srikanth | ............ | H04N 23/843 |
| 11,658,465 B1* | 5/2023 | Alaimo | ............... | H04N 23/74 |
| | | | | 372/50.12 |
| 11,887,404 B2* | 1/2024 | Mequanint | ............. | G06F 21/44 |
| 2006/0183032 A1* | 8/2006 | Misaka | ................... | G03F 1/32 |
| | | | | 430/323 |
| 2008/0106746 A1* | 5/2008 | Shpunt | ................. | G06T 7/521 |
| | | | | 356/610 |
| 2008/0212835 A1* | 9/2008 | Tavor | ................... | G06V 10/24 |
| | | | | 382/103 |
| 2008/0240502 A1* | 10/2008 | Freedman | ........... | G06V 10/145 |
| | | | | 382/103 |
| 2009/0183125 A1* | 7/2009 | Magal | .................. | G06F 3/017 |
| | | | | 715/863 |
| 2010/0008588 A1* | 1/2010 | Feldkhun | ............ | G01B 11/005 |
| | | | | 382/206 |
| 2010/0061216 A1* | 3/2010 | Katayama | ........... | G11B 7/1378 |
| 2011/0188054 A1* | 8/2011 | Petronius | ............. | G02B 26/10 |
| | | | | 356/610 |
| 2013/0247175 A1* | 9/2013 | Nechyba | ............... | G06V 40/16 |
| | | | | 726/19 |

(Continued)

*Primary Examiner* — Usman A Khan

(74) *Attorney, Agent, or Firm* — Donald E. Stout; Stout, Uxa & Buyan, LLP

(57) ABSTRACT

An object detection system includes a projector that projects an original transmitted light on a scene containing an object; an adjustable device configured to shape the original transmitted light, thereby generating a shaped transmitted light; and an image capture device configured to capture an image from a reflected light from the scene. The original transmitted light is alternated with the shaped transmitted light, thereby resulting in an integrated image captured by the image capture device.

16 Claims, 3 Drawing Sheets

(56) References Cited

U.S. PATENT DOCUMENTS

| | | | |
|---|---|---|---|
| 2016/0337564 A1* | 11/2016 | Fournier | H04N 23/74 |
| 2018/0061034 A1* | 3/2018 | Zhao | G01B 11/2513 |
| 2018/0167539 A1* | 6/2018 | Fournier | H04N 23/51 |
| 2019/0035149 A1* | 1/2019 | Chen | G06V 40/166 |
| 2019/0042835 A1* | 2/2019 | Mostafa | G06F 21/32 |
| 2019/0042866 A1* | 2/2019 | Mostafa | G06V 40/171 |
| 2019/0080149 A1* | 3/2019 | Gernoth | G06V 40/166 |
| 2020/0251882 A1* | 8/2020 | Lyon | H01S 5/021 |
| 2020/0319474 A1* | 10/2020 | Ma | G02B 27/4205 |

* cited by examiner

OBJECT DETECTION SYSTEM CAPABLE OF COMPENSATING VARYING LIGHT INTENSITY

BACKGROUND OF THE INVENTION

1. Field of the Invention

The present invention generally relates to an object detection system, and more particularly to a face detection system with relative-intensity compensation.

2. Description of Related Art

Face detection, a specific case of object detection, is a computer technology used in a variety of applications (for example, mobile phones) to identify human faces in an image.

As conventional face detection techniques may be deceived, for example, by a two-dimensional (2D) picture containing the face to be detected, a three-dimensional (3D) scanning device is thus proposed to detect the face of a live person. A structured-light scanner is one of 3D scanning devices for measuring the 3D shape of an object using projected light patterns and a camera system. Face detection is commonly performed based on 2D face recognition and 3D liveness detection. However, while executing 2D face recognition, the received light suffers relative-intensity (RI) effect due to lens characteristics of the camera system. Specifically, light intensity is decreasing with increasing distance away from the center of the received light passing the lens. Therefore, 2D face recognition may probably fail owing to the varying light intensity.

A need has thus arisen to propose a novel face detection system capable of compensating the relative-intensity effect due to lens characteristics.

SUMMARY OF THE INVENTION

In view of the foregoing, it is an object of the embodiment of the present invention to provide an object detection system that alternates an original transmitted light with a shaped transmitted light, thereby compensating varying light intensity due to lens characteristics.

According to one embodiment, a structured-light face detection system includes a projector, a liquid-crystal lens and an image capture device. The projector projects an original transmitted light on a scene containing a human face. The liquid-crystal lens controllably modulates liquid-crystal molecules thereof to shape the original transmitted light, thereby generating a shaped transmitted light. The image capture device captures an image from a reflected light from the scene. The original transmitted light is alternated with the shaped transmitted light, thereby resulting in an integrated image captured by the image capture device.

DETAILED DESCRIPTION OF THE INVENTION

Figure 1:
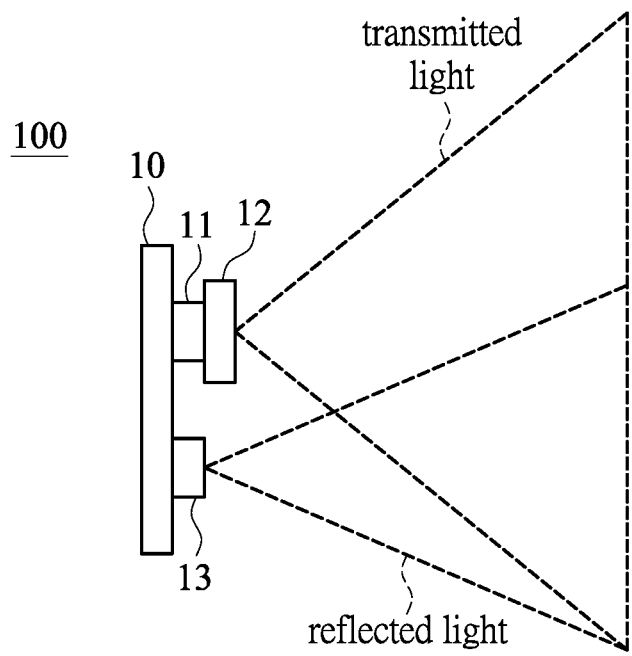
FIG. 1 schematically shows a side view illustrating an object detection system according to one embodiment of the present invention.

FIG. 1 schematically shows a side view illustrating an object detection system 100 according to one embodiment of the present invention. In one embodiment, the object detection system 100 may be adapted to, but not limited to, detecting a human face (i.e., face detection) in an image.

In the embodiment, the object detection system 100 may include a projector 11 (also referred to as transmitter in the pertinent field) configured to project an (original) transmitted light on a scene (that may contain an object such as a person to be detected). The transmitted light may be visible light or invisible light such as infrared light. The projector 11 is disposed on a surface of a support 10. The projector 11 of the embodiment is an optical device, for example, composed of a laser or a light-emitting diode (LED). In one embodiment, the object detection system 100 may be adapted to, but not limited to, structured-light scanning, in which the projector 11 may be operatively switched between three-dimensional (3D) mode and two-dimensional (2D) mode, for example, for projecting dots and a flood light, respectively.

In one embodiment, the projector 11 may include an array of semiconductor diodes arranged according to a predetermined pattern. Specifically, the projector 11 may include an array of vertical-cavity surface-emitting laser (VCSEL) diodes, which are disposed on a substrate (not shown) and are arranged on the substrate according to the predetermined pattern. The VCSEL diodes can be used advantageously in producing a compact and high-density light source.

In another embodiment, the projector 11 may include a diffractive optical element (DOE) that receives collimated light and generates multiple light tiles each containing a replica of the predetermined pattern. The light tiles are generally spaced in a two-dimensional manner. The DOE may include multiple optical components (e.g., refractive optical components) disposed on a substrate. The DOE may be composed of a transparent material such as plastic or glass.

According to one aspect of the embodiment, the object detection system 100 may include a liquid-crystal (LC) lens 12 configured to shape (or change) the transmitted light (projected by the projector 11), by controllably modulating liquid-crystal molecules, for example, to adjust refractivity of the LC lens 12. The LC lens 12 of the embodiment is disposed on a top surface of the projector 11.

In the embodiment, the object detection system 100 may include an image capture device 13 (e.g., camera), also referred to as receiver in the pertinent field, disposed on the (same) surface of the support 10, configured to capture an image from a reflected light (reflected from the scene that may contain an object such as a person).

Figure 2A:
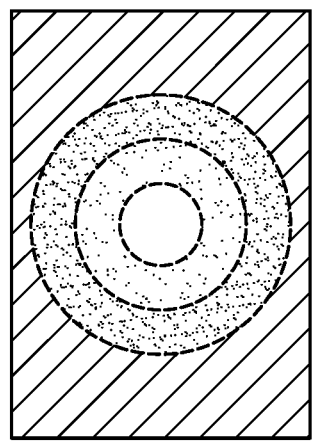
FIG. 2A schematically shows an exemplary captured image corresponding to an original transmitted light that is not shaped by the LC lens with original refractivity.

FIG. 2A schematically shows an exemplary captured image corresponding to an original transmitted light that is not shaped by the LC lens 12 with original refractivity. It is noted that, light intensity is decreasing with increasing distance away from a center of the (original) captured image due to lens characteristics. Accordingly, relative intensity (RI) at the center is higher than relative intensity close to an edge.

Figure 2B:
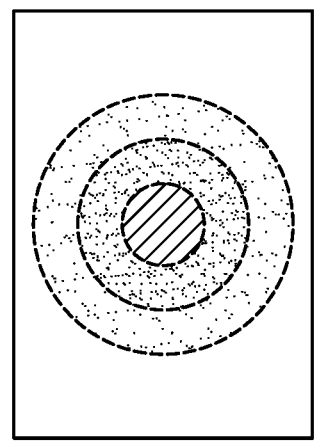
FIG. 2B schematically shows an exemplary captured image corresponding to a shaped transmitted light that is shaped by the LC lens with adjusted refractivity.

FIG. 2B schematically shows an exemplary captured image corresponding to a shaped transmitted light that is shaped by the LC lens 12 with adjusted refractivity. Specifically, light intensity is increasing with increasing distance away from the center of the (shaped) captured image. Accordingly, relative intensity at the center is lower than relative intensity close to the edge. Although a finite number of concentric circles representing the light intensity with abrupt change are depicted in FIG. 2A and FIG. 2B, it is appreciated that light intensity commonly gradates with subtle intensity change.

Generally speaking, an adjustable device (e.g., LC lens 12), capable of controllably adjusting light passing, is adopted in the embodiment to shape the original transmitted light such that light intensity of the shaped captured image (FIG. 2B) corresponding to the shaped transmitted light is complementary to the light intensity of the original captured image (FIG. 2A) corresponding to the original transmitted light.

According to another aspect of the embodiment, the LC lens 12 may alternate the original refractivity with the adjusted refractivity, thereby projecting the shaped transmitted light (e.g., corresponding to the shaped captured image of FIG. 2B) after the original transmitted light (e.g., corresponding to the original captured image of FIG. 2A). The alternation of the original transmitted light and the shaped transmitted light may be performed at least once per frame.

Figure 3:
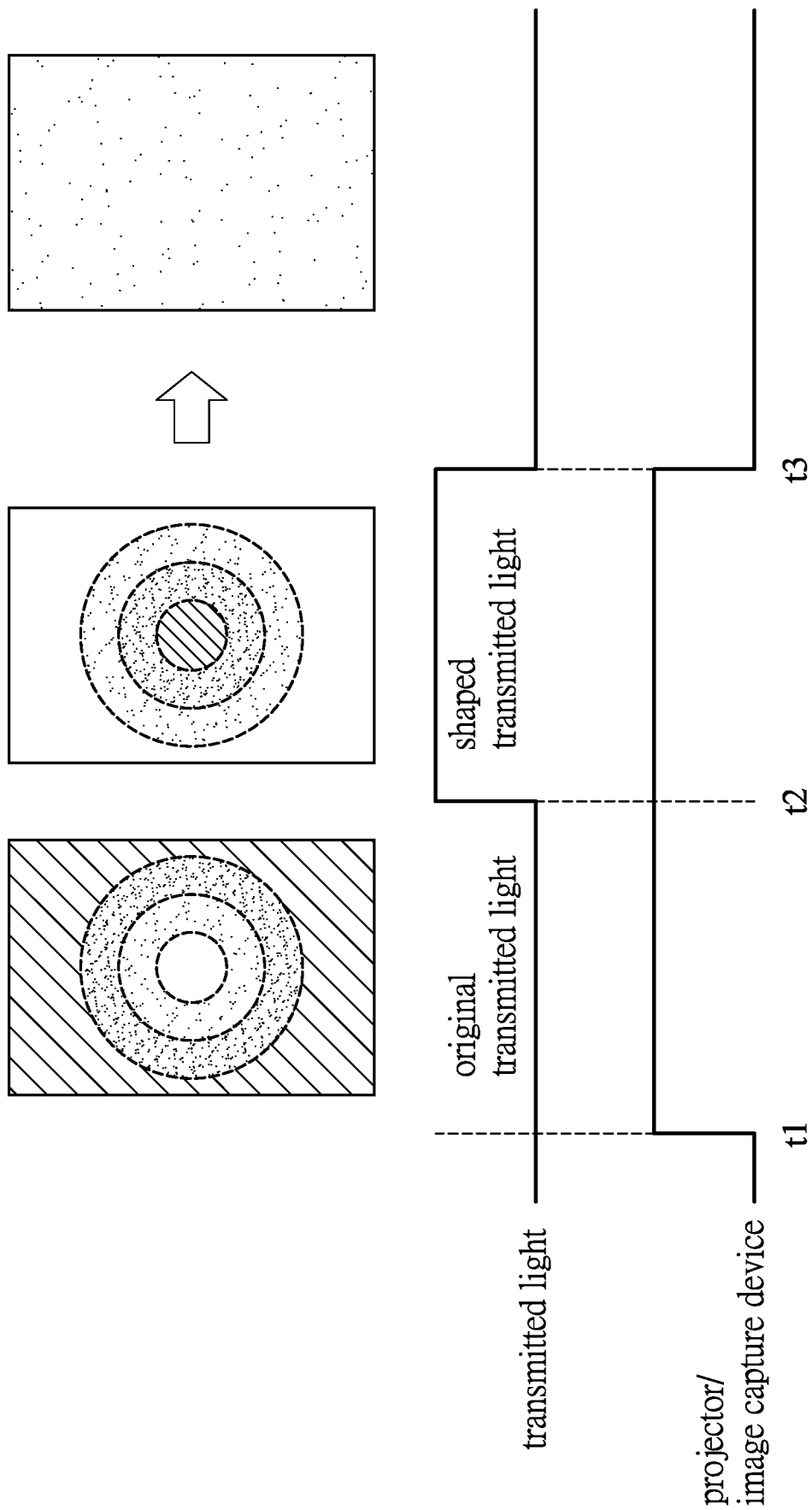
FIG. 3 shows exemplary timing diagrams that illustrate alternating the original transmitted light (t1-t2) with the shaped transmitted light (t2-t3)

FIG. 3 shows exemplary timing diagrams that illustrate alternating the original transmitted light (t1-t2) with the shaped transmitted light (t2-t3). As the light intensity of the original captured image (FIG. 2A) is complementary to the light intensity of the shaped captured image (FIG. 2B), integration of the original captured image and the shaped captured image will result in an integrated image (captured by the image capture device 13) with substantially homogeneous (or constant) light intensity throughout the integrated image. Therefore, the original captured image is compensated by the shaped captured image, thereby resulting in an integrated image with substantially homogeneous light intensity. In the specification, the term "integration" refers to signal or charge accumulation during the exposure time (or integration time).

Figure 4A:
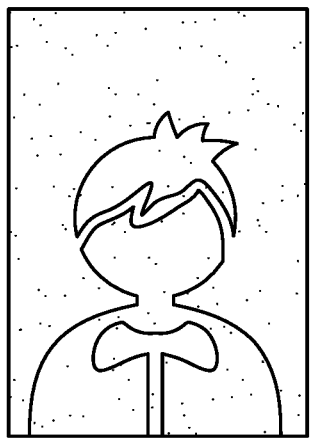
FIG. 4A and FIG. 4B exemplify two captured images with faces on the integrated image by alternating the original transmitted light with the shaped transmitted light.
Figure 4B:
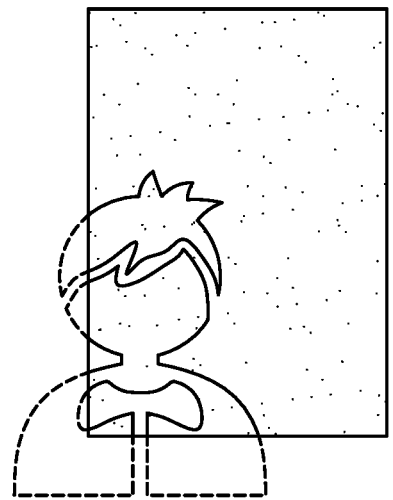

FIG. 4A and FIG. 4B exemplify two captured images with faces on the integrated image by alternating the original transmitted light with the shaped transmitted light. As the integrated image has substantially homogeneous light intensity everywhere, the face can be correctly detected even the face is positioned off center.

Figure 5A:
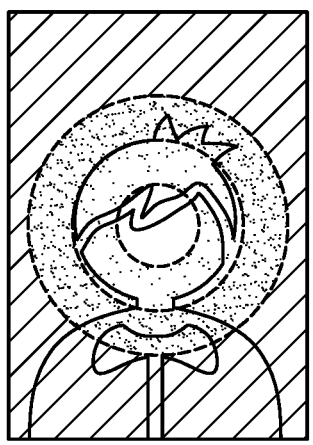
FIG. 5A and FIG. 5B exemplify two captured images with faces on the image with only the original transmitted light (but without a shaped transmitted light).
Figure 5B:
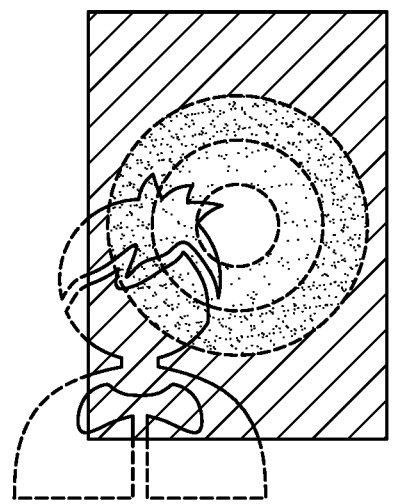

FIG. 5A and FIG. 5B exemplify two captured images with faces on the image with only the original transmitted light (but without a shaped transmitted light). As the image has varying light intensity, the face cannot be correctly detected, particularly when the face is positioned off center (FIG. 5B).

Although specific embodiments have been illustrated and described, it will be appreciated by those skilled in the art that various modifications may be made without departing from the scope of the present invention, which is intended to be limited solely by the appended claims.

What is claimed is:

1. An object detection system capable of compensating varying light intensity, comprising:
   a projector that projects an original transmitted light on a scene containing an object;
   an adjustable device configured to shape the original transmitted light of the projector, thereby generating a shaped transmitted light; and
   an image capture device configured to capture an image from a reflected light from the scene;
   wherein the original transmitted light passing through but not being shaped by the adjustable device is alternated with the shaped transmitted light generated by shaping the original transmitted light of the projector, thereby resulting in an integrated image captured by the image capture device;
   wherein the adjustable device controls relative light intensity of the original transmitted light passing therethrough, where light intensity at a center of the shaped transmitted light is lower than light intensity close to an edge of the shaped transmitted light;
   wherein light intensity of the shaped transmitted light is controlled by the adjustable device to be complementary to light intensity of the original transmitted light to compensate varying light intensity of the original transmitted light, and the shaped transmitted light and the original transmitted light are projected alternately and integrated to produce a light with homogeneous light intensity.

2. The system of claim 1, wherein the object comprises a human face.

3. The system of claim 1, wherein the projector comprises a laser or a light-emitting diode.

4. The system of claim 1, wherein the adjustable device comprises a liquid-crystal lens that controllably modulates liquid-crystal molecules to shape the original transmitted light.

5. The system of claim 1, wherein light intensity of a shaped captured image corresponding to the shaped transmitted light is complementary to light intensity of an original captured image corresponding to the original transmitted light.

6. The system of claim 1, wherein the adjustable device controllably adjusts light passing to shape the original transmitted light.

7. A structured-light face detection system capable of compensating varying light intensity, comprising:
   a projector that projects an original transmitted light on a scene containing a human face;
   a liquid-crystal lens that controllably modulates liquid-crystal molecules thereof to shape the original transmitted light of the projector, thereby generating a shaped transmitted light; and
   an image capture device configured to capture an image from a reflected light from the scene;
   wherein the original transmitted light passing through but not being shaped by the liquid-crystal lens is alternated with the shaped transmitted light generated by shaping the original transmitted light of the projector, thereby resulting in an integrated image captured by the image capture device;
   wherein the liquid-crystal lens controls relative light intensity of the original transmitted light passing therethrough, where light intensity at a center of the shaped transmitted light is lower than light intensity close to an edge of the shaped transmitted light;
   wherein light intensity of the shaped transmitted light is controlled by the liquid-crystal lens to be complementary to light intensity of the original transmitted light to compensate varying light intensity of the original transmitted light, and the shaped transmitted light and the original transmitted light are projected alternately and integrated to produce a light with homogeneous light intensity.

8. The system of claim 7, wherein the projector is operatively switched between three-dimensional (3D) mode and two-dimensional (2D) mode for projecting dots and a flood light, respectively.

9. The system of claim 7, wherein the projector comprises an array of semiconductor diodes arranged according to a predetermined pattern.

10. The system of claim 9, wherein the array of semiconductor diodes comprise vertical-cavity surface-emitting laser (VCSEL) diodes.

11. The system of claim 7, wherein the projector comprises a diffractive optical element (DOE) that receives collimated light and generates multiple light tiles each containing a replica of the predetermined pattern.

12. The system of claim 7, wherein light intensity of a shaped captured image corresponding to the shaped transmitted light is complementary to light intensity of an original captured image corresponding to the original transmitted light.

13. The system of claim 12, wherein the light intensity is decreasing with increasing distance away from a center of the original captured image, and the light intensity is increasing with increasing distance away from a center of the shaped captured image.

14. The system of claim 7, further comprising:
a support on which the projector and the image capture device are disposed.

15. The system of claim 7, wherein the liquid-crystal lens is disposed on a top surface of the projector.

16. The system of claim 7, wherein the liquid-crystal lens controllably adjusts refractivity thereof to shape the original transmitted light.

* * * * *